Patented Mar. 14, 1933

1,901,373

UNITED STATES PATENT OFFICE

ERNEST LIONNE, OF SWAMPSCOTT, MASSACHUSETTS

UREA-FORMALDEHYDE CONDENSATION PRODUCT AND PROCESS

No Drawing.   Application filed September 28, 1928. Serial No. 309,120.

This invention relates to condensation products of urea formaldehyde and to processes for making such products.

The reaction of formaldehyde upon a carbamide or a derivative thereof as urea or thiourea, results in a condensation product which can exist in three stages and the product of a lower stage can be converted and will of itself change by further condensation to an upper stage. In the first stage, the condensation product is liquid, the dispersion mixture being mostly water. If the water is evaporated in the cold, the resultant solid is water soluble. If this solid is heated it becomes water insoluble. Also if the solution thereof is heated, or if a small quantity of any one of several kinds of salts which act as accelerators or catalysers is added to the solution, the latter will gradually thicken and will reach, after a lapse of time which varies with the components, the condition of a more or less solid jelly. This is the second stage of the condensation process.
In this second or jelly stage, the resin is water insoluble but is fusible. If this jelly is left exposed to the open air, and, particularly, if it is exposed to the action of sunlight; or to heat, it will contract, lose gradually its water content, and will ultimately arrive at a stage where it is infusible. This is the third stage.

The conversion of the product from the second or jelly stage to the third stage begins as soon as the second stage is reached. For some purposes, it is desirable to have the condensation product at the second or jelly stage for a relatively long period of time as one or two months without any material conversion of the jelly into the hard and infusible third stage. For instance, in my copending application Serial No. 309,119, filed September 28, 1928 which has matured into Patent No. 1,847,773 I have described a method of making a special kind of paper which involves the use of the resin when it is in the second and jelly stage. In the manufacture of such a paper, the jelly resin is beaten up with the paper making fibres in the usual beater and the resultant mixture is made into paper. It is not practical for commercial reasons to add the jelly resin to the paper stock in the beater as soon as the jelly is prepared. However, if the jelly resin prepared in the usual manner is allowed to stand even a few days before being put into the beater, it will be found that the jelly has hard particles in it and that the paper made of such jelly is uneven in appearance where the hard particles have not united with the fibres and the remainder of the resin in the sheet. These hard particles are the result of a conversion of a part of the jelly resin to the third or hard infusible stage.

I have discovered that the jelly resin can be maintained for a long period of time which is at least two months without any part of it being converted in any detectable manner into the third stage upon standing at ordinary room temperatures by incorporating with the jelly and specifically with the solution from which the jelly is made, a small amount of a colloidal or mucilaginous material which acts as a retarder to hinder the future condensation of the resin. This constitutes one of the objects of the present invention.

A jelly resin which is intimately associated with a retarder can be manufactured and stored for a substantial period of time prior to use and will act as though the jelly resin had been freshly made. The presence of the retarder in the jelly also influences the resultant product as for some purposes it may be desirable to keep the resin in the second stage for so long as is practical.

I have found that the retarder can be a colloidal or mucilaginous substance, such as tragacanth gum, Karaya gum, India gum, starch, dextrin and the like.

In intimately associating the retarder with the jelly resin, I prefer to introduce the retarder into the solution before the jelly has been formed so as to insure a homogeneous mixture of the two. If the resin jelly is made directly from the reaction between formaldehyde and urea, a solution of the retarder can be introduced into the solution of urea and formaldehyde before the solution has been heated to bring about the condensation and the consequent formation of the jelly resin.

I prefer, however, to make a jelly resin by the process set forth in my copending application Serial No. 309,118, filed September 28, 1928. In this process, a urea or other carbamide is first subjected to the action of acetaldehyde in the cold. The urea can be accompanied if desired by a plasticizing agent and an accelerator. A reaction takes place which produces an intermediate compound of a colloidal gelatinous nature which I have termed A-gum. A satisfactory formula is

| | Grams |
|---|---|
| Urea | 100 |
| Glycerin | 50 |
| Acetic acid (glacial) | 10 |

In the above formula, glycerin is the plasticizing agent and acetic acid is the accelerator. The glycerin may be replaced by an ester thereof as acetin and the like. The acetic acid may be replaced by any other suitable acid or salt, the properties of accelerators being now well understood. To this mixture 50 grams of commercially pure acetaldehyde is added. The A-gum is produced from the resultant reaction. This A-gum when cold will be either a thick transparent liquid or a milky rather firm solid according to the proportions of the ingredients in the above formula. I prefer the A-gum as a semi-liquid compound. The A-gum is soluble in water.

The desired resin jelly is prepared from the A-gum by treating it with formaldehyde, preferably in the presence of an accelerator. A suitable formula can be as follows:

| | Grams |
|---|---|
| A-gum | 100 |
| Formaldehyde | 150 |
| Ammonium sulphate | 2.5 |

With the above proportions, the jelly resulting from the reaction is opaque and milky white, and is water insoluble but fusible, and, if it is allowed to stand, or if it is subjected to heat, will gradually become converted into a hard insoluble and infusible resin.

To the solution represented by the immediately above formula, and before the solution has stood long enough, as an hour, to form the jelly, I add to it a mucilaginous solution which may be made up as follows:

| | Parts |
|---|---|
| Water | 100 |
| Karaya gum | 2.5 |

The A-gum formaldehyde solution to which the mucilaginous solution has been added is allowed to stand until the condensation process has been effected and the jelly resin has been formed.

It will be apparent that the proportion of mucilage is relatively small in the jelly resin. By preparing the resin in the above manner, the mucilaginous retarder is dispersed throughout the jelly. The jelly containing the retarder can stand for a long period of time, at least two months, without being converted in any detectable manner to the third or hard, solid, infusible condition. At the end of this period, the jelly if crushed between the fingers will not give any feeling of containing gritty particles. When the jelly is incorporated with paper stock in a paper beater and made into paper in the manner disclosed in my above named application Serial No. 309,119 it will be impossible to detect on the surface of the paper any particle of jelly of any size standing up on the back ground of fibres.

My above application discloses but does not claim the combination of the jelly resin and a retarder as herein described.

I claim:

1. The combination of a urea formaldehyde resin in an intermediate jelly stage of condensation and a colloidal retarder intimately associated therewith which acts to hinder further condensation of said product.

2. The combination of a urea formaldehyde resin in a water insoluble fusible jelly form and a colloidal retarder intimately associated therewith which acts to hinder the conversion of said jelly into a hard infusible form.

3. The combination of a urea formaldehyde resin in a water insoluble fusible jelly form and a colloidal retarder intimately associated therewith which acts to hinder the conversion of said jelly into a hard infusible stage.

4. The combination as defined in claim 3 wherein the retarder is a mucilaginous substance.

5. The combination as defined in claim 2 wherein the retarder is Karaya gum.

6. A urea formaldehyde resin in a water insoluble jelly form having a colloidal retarder to hinder the conversion of said jelly into a hard and infusible form.

7. A urea formaldehyde resin in a water insoluble fusible jelly form having incorporated therewith a mucilaginous substance which acts to retard the conversion of said resin into a hard infusible form.

8. A stable resinous condensation product of urea formaldehyde resin in an intermediate jelly stage of condensation combined with a colloidal substance that acts to hinder its further condensation beyond its jelly stage.

9. The process of making a stable intermediate resinous condensation product in a gel stage of urea and formaldehyde which consists in combining a urea with formaldehyde to form a gel in the presence of a colloidal agent which acts to hinder the condensation of the resultant product beyond said intermediate gel stage.

10. The process of making a stable intermediate resinous condensation product in a gel stage of urea and formaldehyde which consists in combining a urea with formaldehyde to form a gel and a small amount of a mucilaginous material which is present in the resultant gel and which acts therein to hinder further condensation beyond the gel stage.

11. The process of making a stable intermediate resinous condensation product in a gel stage of urea and formaldehyde which consists in introducing a mucilaginous retarding material to a solution of a urea and formaldehyde, effecting the combination of the urea and formaldehyde to produce the resultant gel which will have intimately dispersed through it said mucilaginous material which acts to preserve the gel stage of the product.

12. The process of making a stable intermediate resinous condensation product in a gel stage of a urea and formaldehyde which consists in forming an intermediate compound by the reaction of acetaldehyde upon a urea, forming a solution of said compound with formaldehyde, introducing into this solution a mucilaginous retarding solution, and effecting the combination of said resultant product with urea to form the gel which contains dispersed therein the mucilaginous substance which hinders further condensation of the product beyond the gel stage.

In testimony whereof, I have signed my name to this specification.

ERNEST LIONNE.